(12) United States Patent
Ganai (10) Patent No.: US 8,504,330 B2
(45) Date of Patent: Aug. 6, 2013

(54) PARALLELIZING BOUNDED MODEL CHECKING USING TUNNELS OVER A DISTRIBUTED FRAMEWORK

(75) Inventor: Malay Ganai, Plainsboro, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 1308 days.

(21) Appl. No.: 12/236,684

(22) Filed: Sep. 24, 2008

(65) Prior Publication Data
US 2010/0011057 A1 Jan. 14, 2010

Related U.S. Application Data

(60) Provisional application No. 61/080,461, filed on Jul. 14, 2008.

(51) Int. Cl.
*G06F 17/50* (2006.01)
*G06F 9/445* (2006.01)

(52) U.S. Cl.
USPC .............. 703/2; 703/13; 703/22; 709/226; 709/231; 709/250; 716/106

(58) Field of Classification Search
USPC .. 703/2, 13; 709/259, 231, 226, 250; 716/106
See application file for complete search history.

(56) References Cited

U.S. PATENT DOCUMENTS

| | | | | |
|---|---|---|---|---|
| 6,289,382 | B1* | 9/2001 | Bowman-Amuah | 709/226 |
| 6,332,163 | B1* | 12/2001 | Bowman-Amuah | 709/231 |
| 6,339,832 | B1* | 1/2002 | Bowman-Amuah | 714/35 |
| 6,434,568 | B1* | 8/2002 | Bowman-Amuah | 1/1 |
| 6,871,328 | B1* | 3/2005 | Fung et al. | 716/116 |
| 7,370,291 | B2* | 5/2008 | Fung et al. | 716/105 |
| 2005/0204325 | A1* | 9/2005 | Fung et al. | 716/16 |
| 2009/0216910 | A1* | 8/2009 | Duchesneau | 709/250 |

* cited by examiner

*Primary Examiner* — Thai Phan
(74) *Attorney, Agent, or Firm* — Joseph Kolodka (57) ABSTRACT

A system and method for bounded model checking of computer programs includes decomposing a program having at least one reachable property node for bounded model checking (BMC) into sub-problems by employing a tunneling and slicing-based (TSR) BMC reduction method. The sub-problems of the TSR method are partitioned in a distributed environment, where the distributed environment includes at least one master processing unit and at least one client unit. The sub-problems are solved by each client independently of other clients to reduce communication overhead and provide scalability.

19 Claims, 9 Drawing Sheets

FIG. 1

```
1.  void foo(int a,
2.              int b)
3.    { /* precondition */
4.    assume(1≤a≤10) ;
5.    assume(1≤b≤10) ;
6.    if (a≥b) {
7.      do {
8.        if (b≤a) a=a-b;
9.        else b=b-a;
10.     }while(b!=0);
11.   }else {
12.     do{
13.       if (a≤b) b=b-a;
14.       else a=a-b;
15.     }while(a!=0) ;
16.   }
17.   assert (a!=0 && b!=0) ;
18. }
```

PARALLELIZING BOUNDED MODEL CHECKING USING TUNNELS OVER A DISTRIBUTED FRAMEWORK

RELATED APPLICATION INFORMATION

This application claims priority to provisional application Ser. No. 61/080,461 filed on Jul. 14, 2008 incorporated herein by reference.

BACKGROUND

1. Technical Field

The present invention relates to computer verification and more particularly to decomposing bounded model checking to improve efficiency and reduce complexity for computer program verification by solving the problem in a distributed system.

2. Description of the Related Art

Bounded Model Checking (BMC) is a technique used in computer program verification. Bounded Model Checking (BMC) provides complete design coverage with respect to a correctness property for a bounded depth. In spite of using richer expressive theories to obtain compact representation, and using on-the-fly circuit simplification, each BMC instance at depth k grows bigger in size and harder to solve with successive unrolling of a design.

One possible solution is to use a distributed environment to solve each BMC instance. Due to communication overhead and inherent synchronization in such an environment, there are many challenges in achieving (even close to) linear scaling. Further, due to uneven (and often unpredictable) load and unreliable worker machines, the problem becomes all the more challenging.

Several techniques for distributed BMC have been proposed previously; however, they do not address the scalability requirement adequately.

In one distributed BMC approach, each BMC instance is partitioned structurally so that each processor gets an exclusive number of consecutive BMC time frames. The distributed problem is then solved by a distributed satisfiability (SAT), managed by a central server. Though this method overcomes the memory limitation of a single processor, and employs fine grain parallelization of SAT, it incurs significant communication overhead during the exchange of lemmas and propagation of values across partitions.

In another distributed BMC approach, each BMC instance is solved independently on a separate client. The clause learned is shared between the clients. The entire process is controlled by a master. As each BMC instance is not partitioned, there is a significant slow down as the depth increases. Further, the scalability of the method is limited by the depth d of the BMC. In other words, even if the number of processors n>>d, the method can not exploit the availability of large processors. Moreover, such an approach does not address load balancing.

In a yet another distributed BMC approach, an initial partition is generated using a partial assignment for the initial state and a property being verified. Each partition is sent to a client, which solves the BMC problem for a given depth 1 to k using the partial state assignment as initial states. This assumes that each unrolled transition after initial unrolling has symmetry, and shares clauses learned on the transition. In general, such a method is not scalable, as each client is required to solve the entire BMC problem, though for a different initial state. Also, the problem of uneven load balancing is not addressed.

One can use parallel SAT-solvers to solve BMC instances. However, parallelizing SAT solvers based on Davis-Putnam-Logeman-Loveland (DPLLs) in general incurs large communication and synchronization cost. Also, it is difficult to guide such solvers efficiently using high-level information present in the input problem.

SUMMARY

A tool for parallelizing SMT-based BMC over distributed environment targeted for checking safety properties in low-level embedded (sequential) software is provided. The tool employs a distributed tunneling and slicing-based reduction (D-TSR) approach to decompose disjunctively a BMC instance into simpler and independent sub-problems across a master processor and client processing centers. Such a partitioning cuts down the communication cost, and the idle time of the CPUs during synchronization by solving each BMC instance deterministically across the distributed system. The present approach scales almost linearly with the number of CPUs, which was demonstrated by experimental results.

A system and method for bounded model checking of computer programs includes decomposing a program having at least one reachable property node for bounded model checking (BMC) into sub-problems by employing a tunneling and slicing-based (TSR) BMC reduction method. The sub-problems of the TSR method are partitioned in a distributed environment, where the distributed environment includes at least one master processing unit and at least one client unit. The sub-problems are solved by each client independently of other clients to reduce communication overhead and provide scalability.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

A scalable approach to decompose a Bounded Model Checking (BMC) instance (e.g., a decision problem, $\psi$) disjunctively at depth k into smaller and independent sub-problems is provided. The present approach is based on tunnels, i.e., a set of control paths of length k, instead of partitioning on reachable states. Each sub-problem is simplified using low overhead static transformations and learning, such as, slicing, data path simplification and partition-specific control flow constraints.

Each reduced BMC sub-problem is solved as an independent decision problem $\psi_i$ so that the $\psi$ is satisfiable if and only if there exists a satisfiable $\psi_i$. Such a Tunneling and Slicing-based Reduction (TSR) approach improves the overall BMC performance by reducing the peak requirement of resources.

The present focus is on verifying low-level embedded programs using BMC. To reduce the model size and eliminate redundant checks, often static analyzer tools are applied on these programs as a preprocessing step. Though several such properties get resolved during a static analysis phase, many of the properties still remain unresolved and some properties are flagged as potential design errors to be resolved by the designers. To reduce the burden on the designer, BMC is applied as a last resort. Thus, it is quite important to have a robust and scalable BMC.

Tunneling and Slicing-based Reduction in accordance with the present principles for BMC decomposition has several advantages and overcomes many drawbacks of the prior art, thereby permitting faster and memory-efficient verification of low-level embedded programs. One approach can be easily parallelized over many core CPUs without incurring communication overhead, as the present decomposition produces independent sub-problems.

Each sub-problem obtained by partitioning a BMC instance based on tunnels, i.e., set of control paths of length k. Each sub-problem is reduced using the Tunneling and Slicing-based Reduction (TSR) and solved independently. A distribution framework comprises a single controller (master) and several workers (clients), connected in a star topology.

Communication overhead is addressed by using a disjunctive partitioning and creating independent sub-problems statically and deterministically. Thus, each partition is identified by a unique partition ID. Such partitioning is a lightweight operation, and can be performed by each client to reduce the communication cost. When a master is needed to assign a sub-problem, the master simply has to notify the client of the partition ID and the corresponding BMC depth.

Uneven (unpredictable) load balancing is addressed by relaxing synchronization criteria. Since each sub-problem is independent, the master need not wait for the clients that are slow to respond due to slower CPUs or due to hard sub-problems assigned, at the time of synchronization. This reduces the idle time for (faster) clients. The master dynamically adjusts the available pool of available clients for new partition assignments. The slower clients are removed from the pool at the time of synchronization (after each BMC depth), and added back when the slow clients respond.

The focus is on verifying low-level embedded programs using BMC distributed over multi-core machines. The present approach achieves linear scalability in a distributed environment by cutting down the communication cost, and idle time of the worker-clients during synchronization. The present approach can be seamlessly applied to a distributed environment comprising heterogeneous machines (with different operating systems (OS) and computer processing units (CPUs)).

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 1:
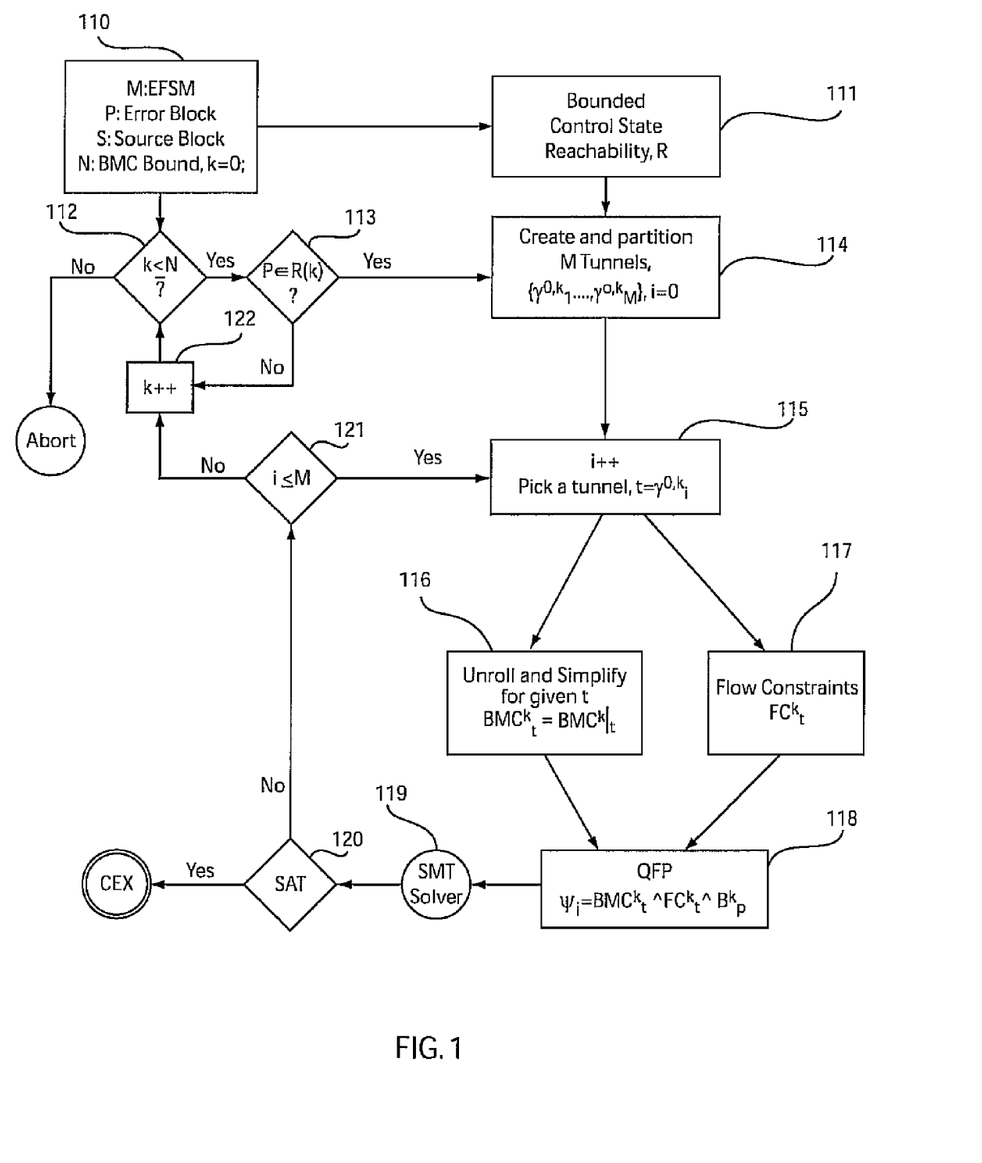
FIG. 1 is a block/flow diagram showing a system/method for bounded model checking decomposition in accordance with the present principles.

Referring now to the drawings in which like numerals represent the same or similar elements and initially to FIG. 1, a system/method 100 of decomposing a bounded model checking (BMC) problems is illustratively depicted, for decomposing BMC problems into simpler and independent problems using a tunneling and slicing based reduction strategy. In block 110, an extended finite state machine (EFSM) M, Error Block P, Source Block S, and BMC bound N are given. An extended finite state machine (EFSM) includes a transition that can be expressed by an "if statement" that if satisfied, the transition is fired, bringing the machine from a current state to a next state and performing the specified operations.

In block 111, bounded control state reachability information R is computed up to the depth N. For every $k \leq N$ in block 112, we check if $P \in R(k)$ in block 113. If P is statically not reachable at depth k, the BMC step of block 114 is skipped at k, and k incremented in block 122 and checked again in block 112. If k equals N, the program is aborted. If P is statically reachable at depth k, BMC decomposition is performed.

In block 114, a tunnel is created, e.g., a set of control paths are created. We then we may partition the tunnel disjunctively (based on the control paths) into a set of M smaller tunnels $\{\gamma^{0,k}_1, \ldots, \gamma^{0,k}_M\}$. We pick an unselected tunnel $t=\gamma^{0,k}_i$ in block 115, and obtain a reduced BMC sub-problem $BMC^k|_t$ in block 116, using on-the-fly simplification of BMC unrolling, while using path constraints imposed by the tunnel $\gamma^{0,k}_i$. Optionally, we also apply flow constraints, $FC^k_t$ in block 117.

For the reachable property node P, we obtain a quantifier-free formula (QFP) (e.g., $BMC^k|_t \hat{} FC^k_t \hat{} B^k_P$) in a decidable subset of first order logic in block 118. In block 119, we check the satisfiability of the reduced and constrained disjunctive BMC formula, independently and individually, preferably using a Satisfiability Modulo Theory (SMT) solver. If the formula is satisfiable in block 120, we stop the BMC as we obtain a counter-example (CEX). Otherwise, we continue picking an unselected tunnel in block 121, if $i \leq M$, by returning to block 115, incrementing i, and picking another tunnel.

If all BMC sub-problems are unsatisfiable, we increase k in block 122. We continue the above process, until we reach the bound N. The present approach provides a basic framework for BMC decomposition based on paths. To reduce the overhead of repeated search over same states, and to exploit incremental solving, various heuristics for partitioning such as graph-based and program semantics-based, and partitioning ordering can be incorporated easily.

The concepts as described with respect to FIG. 1 will now be described in greater detail. An Extended Finite State Machine (EFSM) model M is a 5-tuple $(s_0,C,I,D,T)$ where $s_0$ is an initial state, C is a set of control states (or blocks), I is a set of inputs, D is an dimensional space $D_1 \times \ldots \times D_n$ valuations of n data path variables, and T is a set of 4-tuple (c,x,c',x') transitions where c,c'∈C and x,x'∈X. An ordered pair <c, x>∈C×D is called a configuration or state of M. Let g:D×I↦B={0,1} denote a Boolean-valued enabling condition (or guard), and u:D×I↦D denote an update function. A transition from a state <c,x> to <c',x'> under enabling predicate g(x, i), and update relation u(x, i, x') is represented as $$<c,x> \xrightarrow{g/u} <c',x'>.$$

We assume there is no self-loop, i.e., c≠c'. Let $\Gamma:C \times C \mapsto \{0,1\}$ denote a Boolean predicate such that for c,c'∈C $\Gamma(c,c')=1$ if and only if there is an enabling condition associated with the control transition from c to c'. An NOP state is a control state with no update transition, and a single incoming (outgoing) transition. A SINK state is a unique control state with no outgoing transition, and a SOURCE state is a unique control state with no incoming transition.

Let $s_i \equiv c_i, x_i >$ denote a state, and $T(s_i, s_{i+1})$ denote the state transition relation. A path is a sequence of successive states, denoted as $\pi^{0,k} = (s_0, \ldots, s_k)$, satisfying the predicate $$T^{0,k} \stackrel{def}{=} \bigwedge_{0 \leq i < k} T(s_i, s_{i+1}) \qquad (1)$$

with $\pi^{0,0}=1$. A path has length k if it makes k transitions. A BMC instance comprises checking if an LTL (Linear Temporal Logic) property φ can be falsified in exactly k steps from the initial state so of the following formula: $BMC^k \stackrel{def}{=} T^{0,k} \land \neg \phi(s_k)$ (2) where $\phi(s_k)$ denotes the predicate that φ holds in state $s_k$. BMC iteratively checks the satisfiability of the formula 2 $0 \leq k \leq n$ using an SMT or SAT solver.

A control flow graph (CFG) G=(V,E,r) includes a set of nodes V corresponding to control states, a set of directed control flow edges E, and an entry node r. A CFG is obtained from an EFSM M by ignoring the enabling and updated transitions, i.e., we obtain CFG from M with v=C,E= {(c,c')|$\Gamma(c,c')=1$}, and r=SOURCE.

Figure 2:
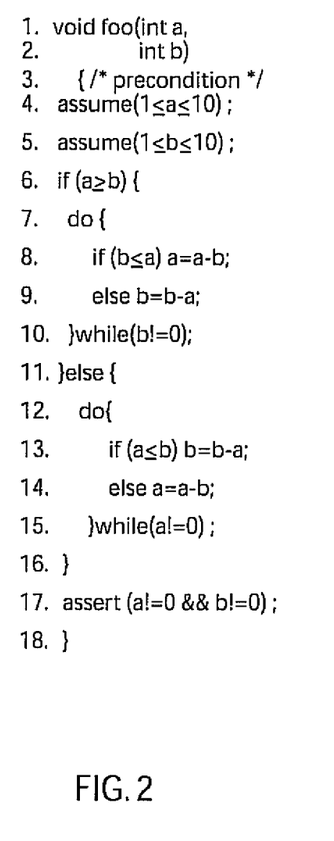
FIG. 2 is an illustrative C program for demonstrating the present principles.

Example: Consider a low-level C program foo as shown in FIG. 2 with a corresponding EFSM shown in FIG. 3. The control states, shown as boxes in FIG. 3, correspond to control points in the program of FIG. 2, as also indicated by the line numbers indicated in the boxes. Note, each control state is identified with a number (1-10) in a small square box attached. For example, SOURCE is block 1 (SOURCE BLOCK), and ERROR is block 10 (ERROR BLOCK). Update transitions of data path expressions are shown at each control state. Transition edges between control states in the EFSM correspond to control flow between their associated control points in the program. Each such edge is associated with an enabling predicate.

A control path is a sequence of successive control states, denoted as $\gamma^{0,k} = c_0, \ldots, c_k$ satisfying the predicate $$\Gamma^{0,k} \stackrel{def}{=} \bigwedge_{0 \leq i < k} \Gamma(c_i, c_{i+1}) \qquad (3)$$

with $\Gamma^{0,0}=1$.

We interchangeably use control state and control node to mean the same thing in the context of EFSM and CFG, respectively. We define a Boolean predicate $B_r \equiv (PC=r)$, where PC is the program counter that tracks the current control state. In the sequel, we use $v^d$ to denote the unrolled variable v at depth d during BMC unrolling.

A control stale reachability (CSR) analysis is a breadth-first traversal of the CFC where a control state b is one step reachable from a iff $\Gamma(a,b)$, i.e., there exists some enabling transition a→b. At a given sequential depth d, let R(d) represents the set of control states that can be reached statically, i.e., ignoring the guards, in one step from the states in R(d−1), with $R(0)=c_0$. We say a control state a is CSR-reachable at depth k if a∈R(k). Computing CSR for the CFG of M (FIG. 3)), we obtain the set R(d) for 0≦d≦7 as follows and as depicted in an unrolled CFG 230 in FIG. 4: R(0)={1}, R(1)={2,6}, R(2)={3,4,7,8}, R(3)={5,9}, R(4)={2,10,6}, R(5)={3,4,7,8}, R(6)={5,9}, R(7)={2,10,6}. For some d (unroll depth), if R(d−1)≠R(d)=R(d+1), we say that the CSR saturates at depth d.

Given two predicates f and g, we define a constraint (or simplify) operator, denoted as $f|_g$, so that $f|_g=f$ if g=1; otherwise, $f|_g$=don't_care. Thus, $f|_g \stackrel{*}{=} f^{\wedge} g$. We say two formulas A and B are equi-satisfiable, denoted as $A \Leftrightarrow_{SAT} B$, if satisfiability of one implies that of the other, and vice versa. For a given set A, we use |A| to denote the size of A.

Modeling C to EFSM: Model building from a given C program under the assumption of a bounded heap and a bounded stack will now be described. We obtain first a simplified CFG by flattening the structures and arrays into scalar variables of simple types (Boolean, integer, float). We handle pointer accesses using direct memory access on finite heap model, and apply standard slicing and constant propagation. We do not inline non-recursive procedures to avoid blow up, but bound and inline recursive procedures. From the simplified CFG, we build an EFSM where each block is identified with a unique id value, and a control state variable PC denoting the current block id. We construct a symbolic transition relation for PC that represents the guarded transitions between the basic blocks. For each data variable, we add an update transition relation based on the expressions assigned to the variable in various basic blocks in the CFG. We use Boolean expressions and arithmetic expressions to represent the update and guarded transition functions. The common design errors are modeled as ERROR blocks.

Figure 4:
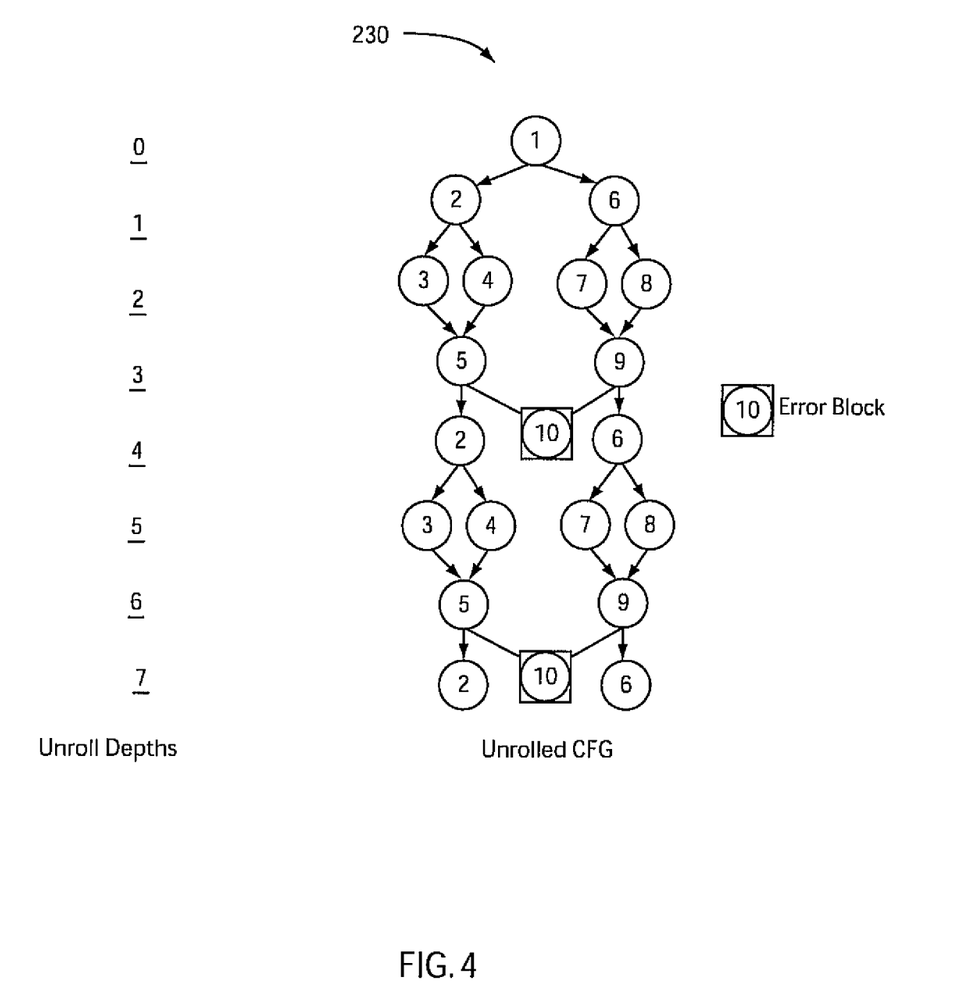
FIG. 4 is an unrolled control flow diagram of depth 7 demonstrating tunnel-posts for demonstrating the present principles.

TUNNELING AND SLICING-BASED REDUCTION (TSR): decomposing a BMC instance at depth k into simpler sub-problems will now be described, where each sub-problem comprises an exclusive subset of concrete paths of length k. Consider the low-level C program foo and its EFSM and CFG shown in FIGS. 2 and 3. We obtain an unrolled CFG by simply unwinding the CFG up to depth k as shown for CFG 230 in FIG. 4 for k=7. Note, each control path in the unrolled CFG 230 is an abstract program path from the initial state, SOURCE. A EMC instance can be obtained by unrolling the EFSM model up to depth k, which captures all the program paths of length k. Further, each program (concrete) path in a BMC instance up to depth k, is an instance of (abstract)

control path in the unrolled CFG 230. As the unrolled depth increases, the number of paths (and control paths) and their lengths also increases, thereby, making each successive BMC instance increasingly harder to solve.

Figure 3:
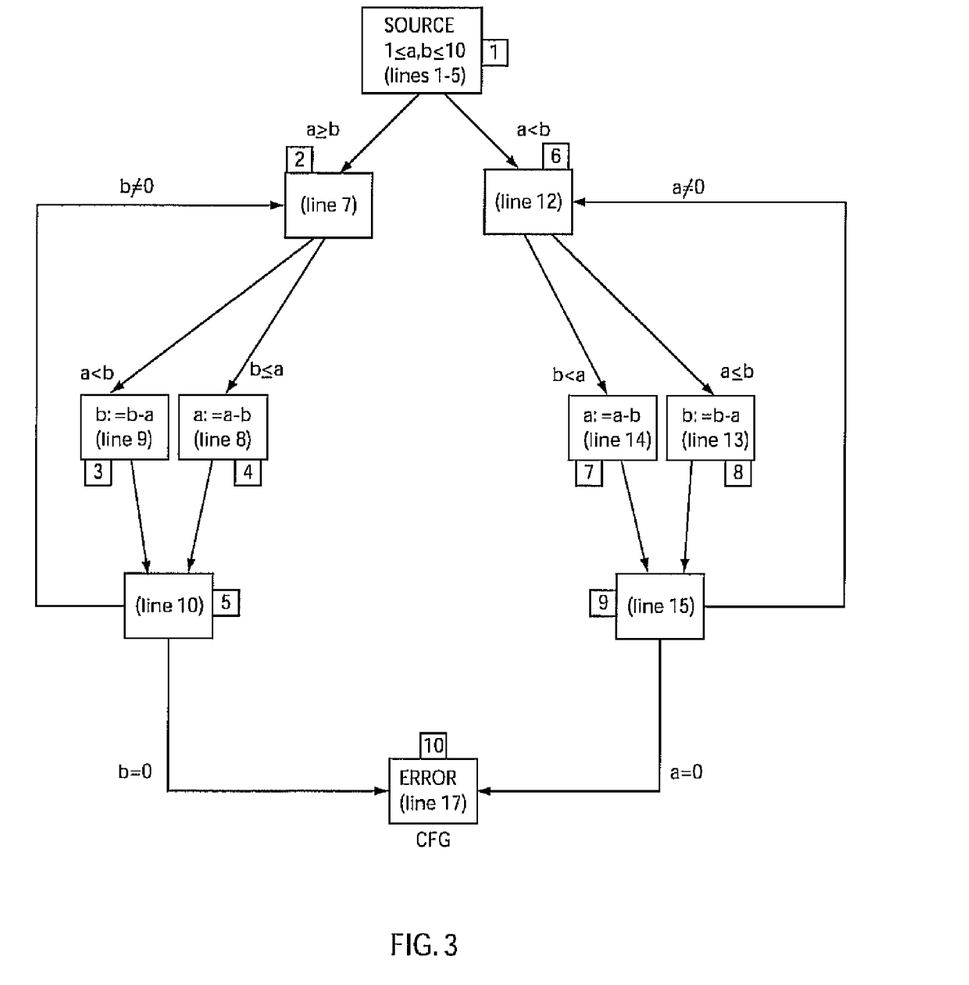
FIG. 3 is an illustrative extended finite state model (EFSM) for the program of FIG. 2 for demonstrating the present principles.

Referring to FIG. 4 with continued reference to FIGS. 2 and 3, the number of control paths to reach error block 10 increases from four to eight, as k (unroll depths) increases from 4 to 7, respectively.

Figure 5:
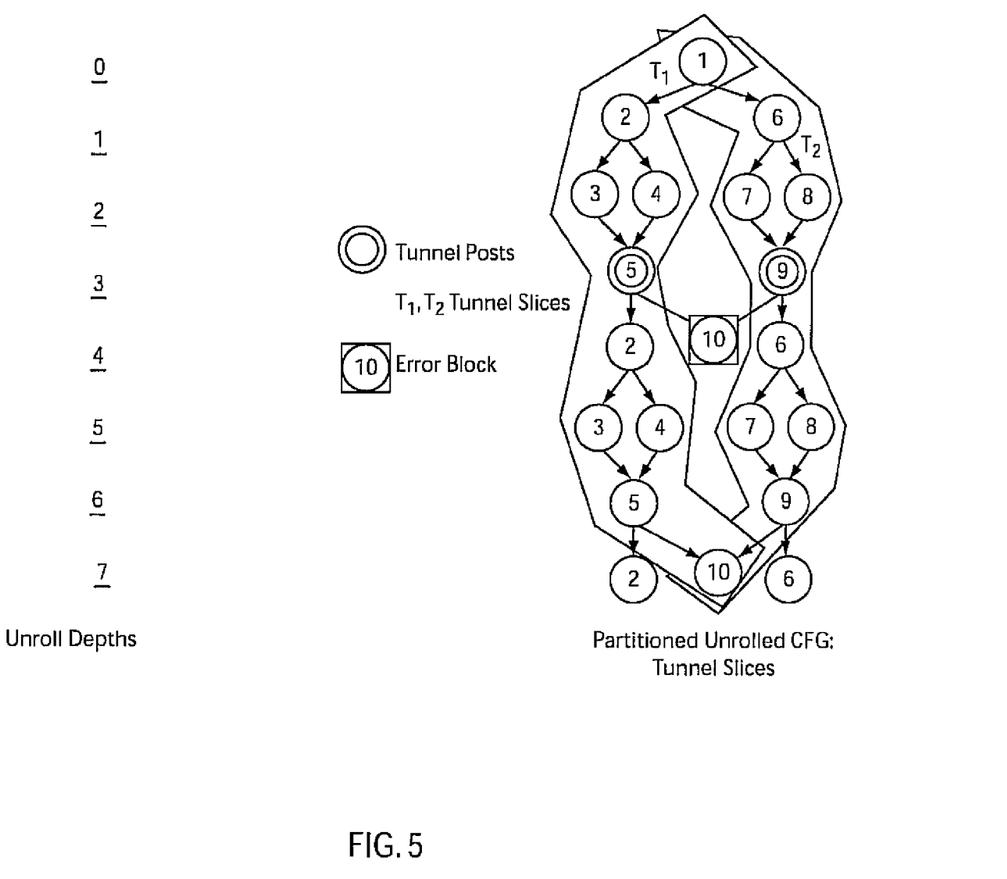
FIG. 5 is a partitioned unrolled control flow diagram of depth 7 showing tunnel partitioning in accordance with the present principles.

In accordance with the present principles, a decomposition of the BMC instance at k=7 into smaller disjunctive sub-problems is performed by partitioning the control paths. Suppose, we choose a partition depth p=3. Note, at this partition depth, control states 5 and 9 are statically reachable. All control paths from block 1 (SOURCE) to block 10 (ERROR) at depth 7 pass through either 5 or 9 (at depth 3). We refer to these control states as "tunnel-posts" (FIG. 5). We obtain a disjoint partition of tunnel-posts, i.e., {5} and {9} in FIG. 5. From the control state(s) in each partitioned tunnel-post, i.e., {5} (or {9}), ERROR block at 7, and the SOURCE block, we perform forward and backward slicing on the unrolled CFG to obtain a disjoint set of control paths, i.e., $T_1$ and $T_2$ as shown in FIG. 5. The disjoint set of control paths are referred to as "tunnels". Note, all control paths in tunnels $T_1$ and $T_2$ in FIG. 5 pass through the partitioned tunnel-posts 5 and 9, respectively at partition depth 3. Clearly, the BMC sub-problems obtained at depth k=7, constrained by tunnel $T_1$ (or $T_2$) have fewer paths, and are potentially easier to solve than the original BMC instance. We solve each BMC sub-problem separately, where the problem is simplified significantly by: 1) slicing away irrelevant paths, i.e., paths not in the tunnel, 2) reducing the data path expressions for the relevant paths, and 3) adding control flow reachability constraints for the relevant paths.

Note, satisfiability of any BMC sub-problem implies satisfiability of the BMC instance. Further, due to independency of the sub-problems with very little sharing, we effectively obtain an efficient method for parallelization. With this basic decomposition idea, we formally present the methods and partition heuristics as well as and systems for implementing them. These mitigate the inherent partitioning overhead.

The Tunneling and Slicing-based Reduction (TSR) method for BMC decomposition has several advantages: 1) the decomposition is path-based in contrast to state-based decomposition, or unrolled time frame based decomposition. By slicing away irrelevant paths not in a partition, each BMC sub-problem is much more reduced than the original BMC instance, and is potentially easier to solve. Further, one can stop BMC as soon as the sub-problem is found satisfiable. Note, each satisfiable trace provides a shortest witness. 2) Unlike sequential execution approaches used in conventional testing, our approach permits more than one control path for symbolic traversal; thereby, we obtain a balance between number of partition and size of partition. 3) In a single threaded environment, at any given time only one sub-problem is solved; which in turn improves the space efficiency. We generate each BMC sub-problem on-the-fly (which can be removed from memory once it is solved). Since computation of each sub-problem is practically "stateless", the resource requirement is decided solely by the "difficulty" of the current sub-problem. Thus, by maintaining the size of the partition small enough, we are able to control the peak resource requirement. 4) Unlike previous approaches, our decomposed sub-problems do not require any communication between them as each sub-problem is independent. For a distributed environment or servers with many-core CPUs, each sub-problem can be scheduled on a separate process, without incurring any communication cost between them. 5) A basic partitioning and sub-problem ordering scheme are targeted to reduce partitioning overhead and exploit incremental solving. This scheme can be enhanced easily using several partitioning heuristics such as graph-partitioning, and procedure call graphs. In short, we provide a basic framework for BMC decomposition based on paths, which is a facilitator for several other heuristics. 6) We have implemented our method in Satisfiability-Modulo-Theory (SMT)-based BMC framework and provide experimental results on industry designs. Our controlled experiments demonstrate the efficacy of our approach.

The system/method of FIG. 1 is employed for decomposing the BMC into simpler and independent problems using Tunneling and Slicing based Reduction (TSR) strategy. Tasks in FIG. 1 will be distributed between a master and clients. As will be described with reference to FIGS. 6 and 7.

Figure 8:
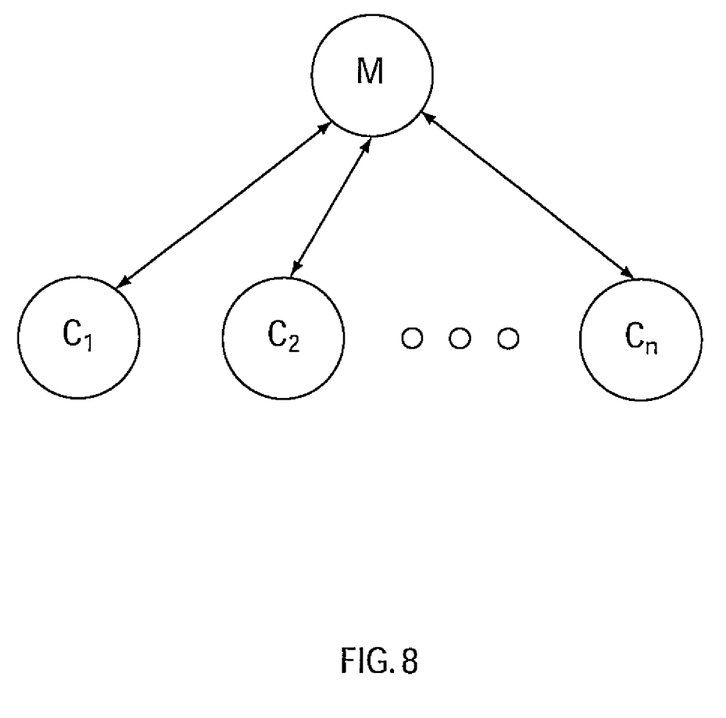
FIG. 8 is a diagram showing a star topology structures for a master and clients in accordance with the present principles.

Referring to FIG. 8, a star topology is shown for illustrating the relationships between a master (M) and clients ($C_1$-$C_n$) Master (M) and clients ($C_i$) in a star topology are connected such that a client ($C_i$) can communicate with only the master (M).

Figure 6:
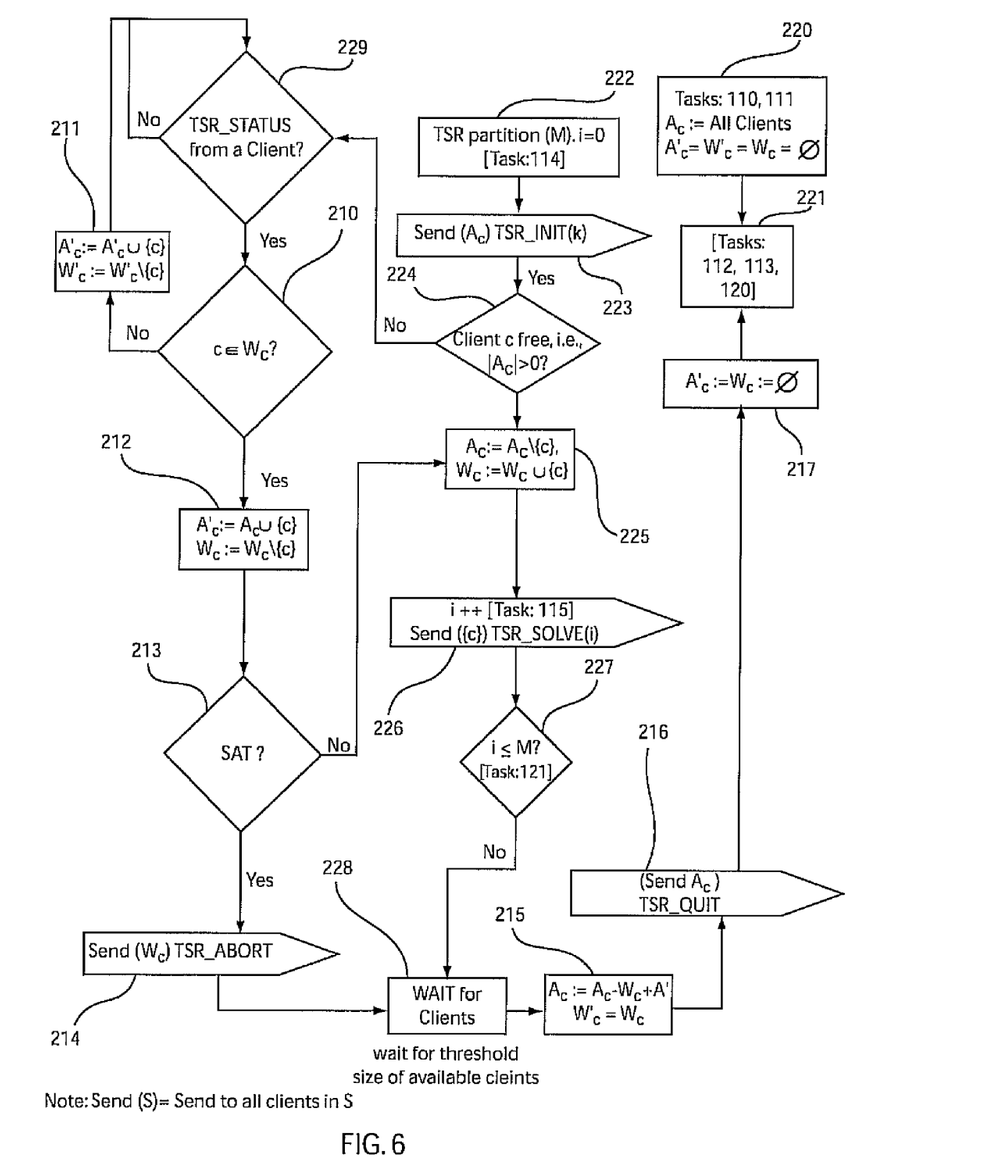
FIG. 6 is a block/flow diagram showing a system/method for bounded model checking decomposition tasks of a master controller in accordance with the present principles.

Referring to FIG. 6, a master acts as a central controller. In block 220, the master performs tasks in blocks/tasks 110, 111 (FIG. 1). Let $A_c$ denote a set of available clients, $W_c$ denote a set of current busy clients, $W'_c$ denote a set of previously busy clients, and $A'_c$ denote a set of clients that are available but included in $A_c$. Initially, the master sets $A_c$ to all available clients, and sets $W_c$, $A'_c$ and $W'_c$ to null. In block 221, the master performs tasks 112, 113 and 120 (FIG. 1). In block 222, the master creates M TSR partitions (task 114 or FIG. 1) for a BMC at depth k. In block 223, the master notifies all the clients in the set $A_c$ to carry out TSR_INIT(k) (described later).

In blocks 224, 225, 226 and 227, the master distributes M TSR partitions among $A_c$ clients on a first available basis. In block 224, the master checks if there is any available client c, i.e. $|A_c|>0$. If so, the master removes the client c from $A_c$ and adds it to $W_c$ (in block 225) where $A_c:=A_c\setminus\{c\}$ and $Wc:=W_c\cup\{c\}$. The master picks a partition (unassigned) i and notifies the client c to carry out TSR_SOLVE on the partition with id i (task 115 of FIG. 1, and block 226).

In block 227, the master checks whether all M partitions are distributed (task 111, FIG. 1). If all partitions are not assigned and no client is available, the master waits (block 228) for some client to respond (block 229) with TSR_STATUS. If a client c responds in block 210, the master checks if c is in the set of current busy clients, i.e., $c\in W_c$. If no, the master updates the sets $A'_c$ and $W'_c$ that track the out-of-order messages, i.e., messages corresponding to a TSR_SOLVE of previous TSR_INIT in block 211. This includes $A_c':=A_c'\cup\{c\}$ and $W_c':=W_c'\setminus\{c\}$. Otherwise, the sets $A_c$ and $W_c$ are updated in block 212 by $A_c:=A_c\cup\{c\}$ and $W_c:=W_c\setminus\{c\}$.

The master checks if the status sent is satisfied (SAT) in block 213. If no, the master then assigns a next partition to solve as shown in blocks 225, 226 and 227. If the status is SAT, then the master sends TSR_ABORT to all clients in the set $W_c$ in block 214. The master then waits for the clients to respond, in block 228, so that the number of available clients, $|A_c|$ is above a threshold size. In block 215, the master updates $A_c$ and $W'_c$. This may include $A_c$: $A_c-W_c+A_c'$ and $W_c':=W_c$. The master then sends TSR_QUIT to clients in $A_c$ in block 216. In block 217, the master initializes the set $A'_c$ and $W_c$ to null and then continues with the block 221.

Figure 7:
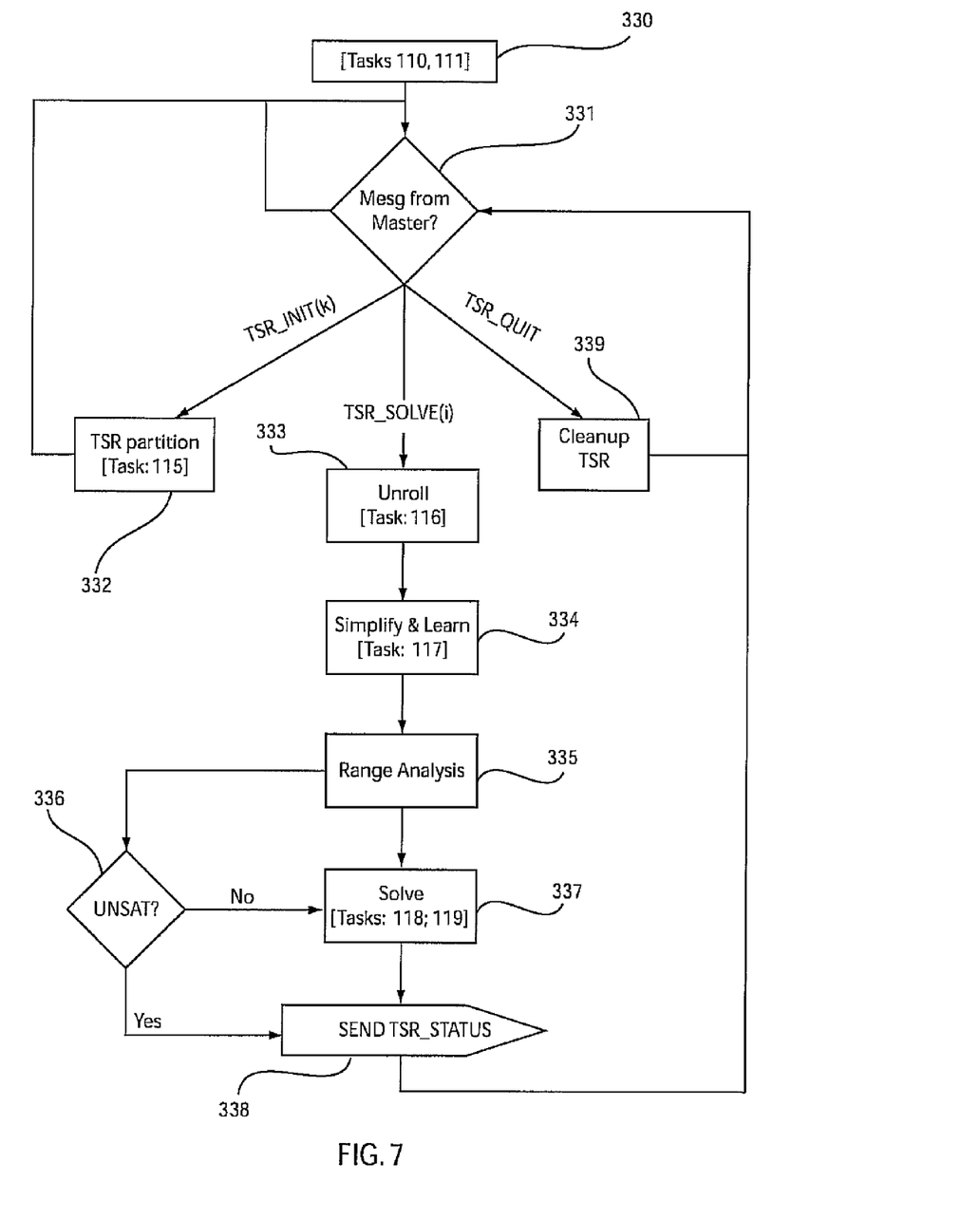
FIG. 7 is a block/flow diagram showing a system/method for bounded model checking decomposition tasks of a client controller in accordance with the present principles.

Referring to FIG. 7, the tasks of a client are illustratively shown. In block 330, the client performs the tasks 110 and 111 of FIG. 1. In block 331, the client waits for a message from the master. If the message is TSR_INIT(k), the client carries out TSR partitioning of BMC instance at depth k (task 115 of FIG. 1, and block 332). As the partitioning of TSR is deterministic, the partitioning by both master and client produces identical results, and therefore each partition can be identified unambiguously by both master and client.

If the message is TSR_SOLVE(i), the client unrolls (task 116 of FIG. 1, and block 333), simplifies and adds learning constraints (task 117 of FIG. 1, and block 334) for the partition i. The client performs light-weight symbolic range analysis (in block 335) to check if the BMC instance is unsatisfiable (UNSAT) in block 336). If the result is unsatisfiable, the client sends UNSAT as a TSR_STATUS message to the master in block 338. Otherwise, the client invokes a SMT/SAT solver to check if the TSR partition is satisfiable (tasks 118, 119, block 337). The client also checks periodically (in block 337), if there is a message TSR_ABORT (not shown). If such a message exists, it simply aborts and replies back ABORT as the TSR_STATUS message. Otherwise, the client sends the SAT/UNSAT result as the TSR_STATUS in block 338.

Advantageously, the task distribution of the method in FIG. 1 as shown in FIGS. 6 and 7 provides a new and efficient way of improving BMC processes in software verification. Unlike other distributed BMC methods, the communication overhead in accordance with the present embodiments is very insignificant as the partitions are independently solved by each client. Unlike other conventional systems, the present principles decompose a BMC instance at a given depth. In the present approach, the idle time of a client is reduced significantly, thereby, improving the overall scalability of the present approach.

Solving each BMC instance gets difficult with the analysis depth. By partitioning and distributing the tasks corresponding to solving the BMC instance, as described in FIGS. 6 and 7, we achieve linear scalability. Further, due to low communication overhead and relaxed synchronization, we achieve improved resource utilization for a distributed BMC application.

Figure 9:
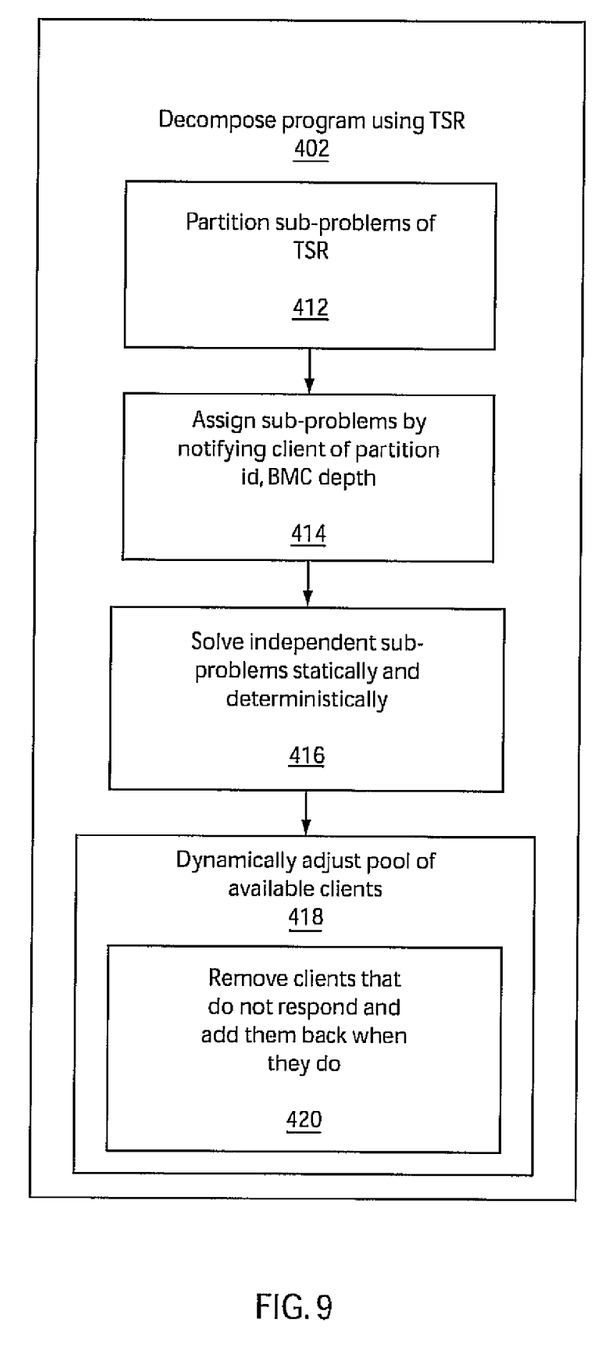
FIG. 9 is a block/flow diagram showing a system/method for a distributed bounded model checking decomposition in accordance with the present principles.

Referring to FIG. 9, a system/method for bounded model checking of computer programs is illustratively depicted. In block 402, a program having at least one reachable property node for bounded model checking (BMC) is decomposed into sub-problems by employing a tunneling and slicing-based (TSR) BMC reduction method.

The TSR method preferably includes creating at least one tunnel based on disjunctive control paths through the program; obtaining a reduced BMC sub-problem using BMC unrolling, while using path constraints imposed by the at least one tunnel; and for the reachable property node, determining a quantifier-free formula (QFP) in a decidable subset of first order logic. Satisfiability of the QFP is checked, independently and individually, to determine whether the QFP is satisfiable for the sub-problem. The decomposing continues until a BMC bound is reached. These steps for decomposing are distributed among clients and organized by the master.

In block 412, the sub-problems of the TSR method are partitioned in a distributed environment, where the distributed environment includes at least one master processing unit and at least one client unit. This includes disjunctive partitioning wherein independent sub-problems are created and solved statically and deterministically by clients. The at least one master and the at least one client are preferably arranged for communication such that the clients communicate only with the at least one master.

Note, partitioning of a BMC instance (at a given depth) is performed by all, both by the master and the clients, but deterministically. However, solving is done independently by clients on the assigned sub-problems (by master). By deterministic partitioning (which is not a time consuming job), the master can send an exclusive sub-problem task to a client by sending just the partition id and depth, instead of sending the entire sub-problem, thereby reducing the communication overhead. By exclusive, it is meant that the same problem is not assigned to two different clients.

In block 414, a sub-problem is preferably assigned by notifying a client of a partition identifier and a corresponding BMC depth. In block 416, the sub-problems are solved by each client independently of other clients to reduce communication overhead and provide scalability. In block 418, the at least one master controls activity of the at least one client and dynamically adjusts an available pool of clients based on client responses. This includes removing clients that do not respond in accordance with a synchronization schedule and adding these clients back when these clients tender a response in block 420.

Having described preferred embodiments of a system and method for parallelizing bounded model checking using tunnels over a distributed framework (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for bounded model checking of computer programs, the method comprising:
decomposing a program having at least one reachable property node for bounded model checking (BMC) into sub-problems by employing a tunneling and slicing-based (TSR) BMC reduction method by:
assigning the sub-problems of the TSR method in a distributed environment, where the distributed environment includes at least one master processing unit and at least one client unit; and
solving the sub-problems by each client independently of other clients to reduce communication overhead and provide scalability,
wherein decomposing includes:
creating at least one tunnel based on disjunctive control paths through the program;
obtaining a reduced BMC sub-problem using BMC unrolling, while using path constraints imposed by the at least one tunnel;
for the reachable property node, determining a quantifier-free formula (QFP) in a decidable subset of first order logic; and
checking satisfiability of the QFP, independently and individually, to determine whether the QFP is satisfiable for the sub-problem.

2. The method as recited in claim 1, further comprising:
continuing the decomposing until a BMC bound is reached.

3. The method as recited in claim 1, wherein the at least one master controls activity of the at least one client and the method further comprises dynamically adjusting an available pool of clients based on client responses.

4. The method as recited in claim 3, wherein dynamically adjusting includes removing clients that do not respond in accordance with a synchronization schedule and adding these clients back when these clients tender a response.

5. The method as recited in claim 1, wherein the at least one master and the at least one client are arranged for communication such that the clients communicate only with the at least one master.

6. The method as recited in claim 1, further comprising: disjunctive partitioning,
wherein independent sub-problems are created deterministically by clients, and solving includes statically solving an exclusive subset of sub-problems by clients.

7. The method as recited in claim 1, further comprising:
assigning a sub-problem by notifying a client of a partition identifier and a corresponding BMC depth.

8. A method for bounded model checking of computer programs, the method comprising:
decomposing a program having at least one reachable property node for bounded model checking (BMC) into sub-problems by employing a tunneling and slicing-based (TSR) BMC reduction method by:
assigning sub-problems by a master controller to one or more clients controllers;
partitioning the sub-problems of the TSR method by a client controller or the master controller in response to a first message from the master controller; and
solving the sub-problems by a respective client corresponding to a second message from the master controller, where solving is performed independently of other clients to reduce communication overhead and provide scalability.

9. The method as recited in claim 8, wherein decomposing includes:
creating at least one tunnel based on disjunctive control paths through the program;
obtaining a reduced BMC sub-problem using BMC unrolling, while using path constraints imposed by the at least one tunnel;
for the reachable property node, determining a quantifier-free formula (QFP) in a decidable subset of first order logic; and
checking satisfiability of the QFP, independently and individually, to determine whether the QFP is satisfiable for the sub-problem.

10. The method as recited in claim 8, further comprising:
continuing the decomposing until a BMC bound is reached.

11. The method as recited in claim 8, wherein the master controller controls activity of the one or more clients and the method further comprises dynamically adjusting an available pool of clients based on client responses.

12. The method as recited in claim 11, wherein dynamically adjusting includes removing clients that do not respond in accordance with a synchronization schedule and adding these clients back when these clients tender a response.

13. The method as recited in claim 8, wherein the master controller and the client controller are arranged for communication such that the clients communicate only with the master controller.

14. The method as recited in claim 8,
wherein partitioning includes disjunctive partitioning, and
wherein independent sub-problems are created deterministically by clients, and solving includes statically solving an exclusive subset of sub-problems by clients.

15. The method as recited in claim 8, further comprising:
assigning a sub-problem by notifying a client of a partition depth and a corresponding BMC depth.

16. A system for bounded model checking of computer programs, the system comprising:
a master controller configured to control communication with one or more client controllers; and
a tunneling and slicing-based (TSR) BMC reduction method configured to decompose a computer program into sub-problems, the computer program having at least one reachable property node for bounded model checking (BMC),
wherein the one or more client controllers are configured to partition the sub-problems of the TSR method and solve the sub-problems independently of other clients to reduce communication overhead and provide scalability.

17. The system as recited in claim 16, wherein the master controller controls activity of the client controllers by dynamically adjusting an available pool of clients based on client responses, removing clients that do not respond in accordance with a synchronization schedule and adding these clients back when these clients tender a response.

18. The system as recited in claim 16, wherein the master controller and the client controllers are arranged in a star topology such that the client controllers communicate only with the master controller.

19. The system as recited in claim 16, wherein the one or more client controllers disjunctively partition independent sub-problems deterministically and solve an exclusive subset of the sub-problems statically.

* * * * *